US007475452B2

(12) United States Patent
Yeh

(10) Patent No.: US 7,475,452 B2
(45) Date of Patent: Jan. 13, 2009

(54) SWIVEL STRUCTURE FOR INFORMATION PRODUCT

(75) Inventor: Chen-Kuang Yeh, Taipei (TW)

(73) Assignee: Premier Image Technology Corporation, Taipei (TW)

( * ) Notice: Subject to any disclaimer, the term of this patent is extended or adjusted under 35 U.S.C. 154(b) by 1510 days.

(21) Appl. No.: 10/442,122

(22) Filed: May 21, 2003

(65) Prior Publication Data
US 2004/0246357 A1 Dec. 9, 2004

(51) Int. Cl.
E05D 3/10 (2006.01)
(52) U.S. Cl. .................. 16/367; 361/681; 248/921; 379/433.13
(58) Field of Classification Search .................. 16/367, 16/366; 348/333.06; 361/681; 379/433.13; 439/4, 6; 248/921
See application file for complete search history.

(56) References Cited
U.S. PATENT DOCUMENTS

| 5,947,440 | A  | * | 9/1999  | Cho ............................ 361/681 |
| 6,105,919 | A  | * | 8/2000  | Min ............................ 248/418 |
| 6,268,997 | B1 | * | 7/2001  | Hong .......................... 361/681 |
| 6,498,721 | B1 | * | 12/2002 | Kim ............................ 361/681 |
| 6,549,789 | B1 | * | 4/2003  | Kfoury ..................... 455/550.1 |
| 6,553,625 | B2 | * | 4/2003  | Lin et al. ..................... 16/342 |
| 6,587,333 | B2 | * | 7/2003  | Tseng et al. ................ 361/681 |
| 6,694,570 | B2 | * | 2/2004  | Chen ............................ 16/367 |
| 6,742,221 | B2 | * | 6/2004  | Lu et al. ...................... 16/367 |
| 6,772,983 | B1 | * | 8/2004  | Liao et al. ................ 248/291.1 |
| 6,798,646 | B2 | * | 9/2004  | Hsu ............................ 361/681 |
| 6,804,861 | B2 | * | 10/2004 | Hsu ............................ 16/366 |
| 6,850,407 | B2 | * | 2/2005  | Tanimoto et al. ............ 361/681 |
| 6,867,961 | B2 | * | 3/2005  | Choi ........................... 361/681 |
| 6,876,545 | B2 | * | 4/2005  | Tseng et al. ................ 361/681 |
| 6,883,206 | B2 | * | 4/2005  | Yang et al. .................... 16/337 |
| 6,958,902 | B2 | * | 10/2005 | Tseng et al. ................ 361/681 |
| 6,965,413 | B2 | * | 11/2005 | Wada .......................... 348/376 |
| 7,024,727 | B1 | * | 4/2006  | Huang et al. .................. 16/354 |
| 7,024,729 | B2 | * | 4/2006  | Chang et al. .................. 16/367 |
| 7,047,598 | B2 | * | 5/2006  | Huang .......................... 16/312 |
| 7,123,472 | B2 | * | 10/2006 | Huang et al. ................ 361/681 |
| 7,130,186 | B2 | * | 10/2006 | Yu .............................. 361/681 |
| 7,133,280 | B2 | * | 11/2006 | Love .......................... 361/681 |
| 7,136,687 | B2 | * | 11/2006 | Chang ...................... 455/575.3 |
| 7,146,195 | B2 | * | 12/2006 | Sudo et al. ............... 455/575.1 |
| 7,150,074 | B2 | * | 12/2006 | Shiba ........................... 16/367 |
| 7,158,816 | B1 | * | 1/2007  | Mizuta et al. ............ 455/575.3 |
| 7,168,135 | B2 | * | 1/2007  | Jung et al. .................... 16/367 |
| 7,234,204 | B2 | * | 6/2007  | Liu et al. ..................... 16/367 |
| 7,266,864 | B2 | * | 9/2007  | Kim ............................ 16/367 |

(Continued)

Primary Examiner—Ross N Gushi
(74) Attorney, Agent, or Firm—Browdy and Neimark, P.L.L.C.

(57) ABSTRACT

A swivel structure for information product, used to connect a monitor and a main body of portable information product, comprises a rotating mechanism, and a flexible cable. The rotating mechanism has a rotator and a rotating pin. The rotator pivotally connects with the main body in a vertical axial direction. The rotating pin is rotatably mounted in the rotator, and connects with the monitor in a horizontal axial direction. The flexible cable is generally formed in a general L-shape. The flexible cable is retractably winding in the rotator and electrically connects the monitor with the main body. A detecting device has a detecting contactor engaged on the round base of the rotating pin, and a detecting printed circuit board fixed in the main body, and is contiguous contact with the detecting contactor.

11 Claims, 10 Drawing Sheets

U.S. PATENT DOCUMENTS

| | | | |
|---|---|---|---|
| 7,272,423 B2 * | 9/2007 | Satoh et al. | 455/575.3 |
| 7,274,561 B2 * | 9/2007 | Takeguchi | 361/681 |
| 7,289,627 B2 * | 10/2007 | Satoh et al. | 379/433.13 |
| 7,308,733 B2 * | 12/2007 | An et al. | 16/367 |
| 7,320,153 B2 * | 1/2008 | Watanabe et al. | 16/367 |
| 7,336,782 B2 * | 2/2008 | Watanabe et al. | 379/433.13 |
| 7,345,871 B2 * | 3/2008 | Lev et al. | 361/681 |
| 7,375,956 B2 * | 5/2008 | Chuang et al. | 361/683 |
| 7,384,021 B2 * | 6/2008 | Liao | 248/415 |
| 7,401,383 B2 * | 7/2008 | Pan | 16/367 |
| 7,404,234 B2 * | 7/2008 | Lee et al. | 16/322 |
| 2003/0040288 A1 * | 2/2003 | Kang et al. | 455/90 |
| 2003/0052857 A1 * | 3/2003 | Pappas | 345/156 |
| 2003/0064758 A1 * | 4/2003 | Mizuta et al. | 455/566 |
| 2003/0167600 A1 * | 9/2003 | Chien et al. | 16/367 |
| 2003/0193773 A1 * | 10/2003 | Choi | 361/683 |
| 2004/0008477 A1 * | 1/2004 | Tseng et al. | 361/681 |
| 2004/0012920 A1 * | 1/2004 | Tanimoto et al. | 361/683 |
| 2004/0061999 A1 * | 4/2004 | Takemoto et al. | 361/683 |
| 2004/0083577 A1 * | 5/2004 | Lu et al. | 16/367 |
| 2004/0107540 A1 * | 6/2004 | Hsu | 16/366 |
| 2004/0109286 A1 * | 6/2004 | Shin | 361/683 |
| 2004/0141287 A1 * | 7/2004 | Kim et al. | 361/683 |
| 2004/0160733 A1 * | 8/2004 | Hsu | 361/681 |
| 2004/0179330 A1 * | 9/2004 | Lee et al. | 361/679 |
| 2004/0198474 A1 * | 10/2004 | Jung et al. | 455/575.1 |
| 2004/0200036 A1 * | 10/2004 | Liao | 16/316 |
| 2004/0200038 A1 * | 10/2004 | Kim | 16/367 |
| 2004/0203532 A1 * | 10/2004 | Mizuta | 455/90.3 |
| 2004/0228081 A1 * | 11/2004 | Lee | 361/683 |
| 2004/0246357 A1 * | 12/2004 | Yeh | 348/333.01 |
| 2005/0005401 A1 * | 1/2005 | Bae | 16/374 |
| 2005/0079897 A1 * | 4/2005 | Nishijima et al. | 455/575.1 |
| 2005/0102799 A1 * | 5/2005 | Huang | 16/367 |
| 2005/0119023 A1 * | 6/2005 | Sudo et al. | 455/550.1 |
| 2005/0141703 A1 * | 6/2005 | Hickey et al. | 379/433.13 |
| 2005/0160558 A1 * | 7/2005 | Kim | 16/367 |
| 2005/0198779 A1 * | 9/2005 | Jung et al. | 16/367 |
| 2005/0198780 A1 * | 9/2005 | Liu et al. | 16/367 |
| 2005/0207104 A1 * | 9/2005 | Love | 361/683 |
| 2005/0245294 A1 * | 11/2005 | Gupte et al. | 455/575.1 |
| 2005/0251965 A1 * | 11/2005 | Lu et al. | 16/367 |
| 2005/0254203 A1 * | 11/2005 | Choi et al. | 361/681 |
| 2005/0285963 A1 * | 12/2005 | Misawa et al. | 348/333.06 |
| 2006/0107492 A1 * | 5/2006 | Chang et al. | 16/367 |
| 2006/0187625 A1 * | 8/2006 | Jung et al. | 361/681 |
| 2006/0201098 A1 * | 9/2006 | Jung | 52/653.1 |
| 2006/0250761 A1 * | 11/2006 | Tsai et al. | 361/681 |
| 2006/0262496 A1 * | 11/2006 | Lee | 361/683 |
| 2007/0050946 A1 * | 3/2007 | Shih et al. | 16/367 |
| 2007/0104467 A1 * | 5/2007 | Wang et al. | 386/125 |
| 2007/0107000 A1 * | 5/2007 | Peng | 720/600 |
| 2007/0159782 A1 * | 7/2007 | Nakajima | 361/683 |
| 2007/0210221 A1 * | 9/2007 | Kim et al. | 248/124.1 |
| 2007/0285881 A1 * | 12/2007 | Nakajima | 361/681 |

* cited by examiner

SWIVEL STRUCTURE FOR INFORMATION PRODUCT

BACKGROUND OF THE INVENTION

1. Field of the Invention

The present invention relates to a swivel structure for information product, and particularly to a swivel structure for connecting a main body to a monitor of portable information product.

2. Description of the Prior Art

All of the portable information products, for example, notebook, digital camera, or digital video camera, need a small-scale swivel structure for connecting a monitor to a main body, so as to let users view conveniently from various angles. Particularly the functions of information product more and more, and the picture quality is requested higher and higher, it usually uses the flexible cable to substitute for the traditional cable for connecting the monitor to the main body. Because of the flexible cable occupies less space, and has the advantage of being full of flexibility.

For the monitor could be swiveling in horizontal and vertical directions, and passing the strict test of frequently turning, the swivel structure is requested to be small so as to occupy less space and be rigid for meeting frequently turning. Another aspect, how to arrange the flexible cable in the swivel structure properly is also a rear problem.

Referring to the FIG. 1, a flexible cable 100 has a first and second horizontal portions 110, 130, and a first and second vertical portions 120, 140. In which of the flexible cable 100, each of the portions have two parallel upper and lower cables (a and b), the horizontal portion 130 has an U-shape curve 131.

Referring to the FIG. 2 and FIG. 2A, the swivel structure of prior art has a base 210, a bracket 230 for connecting a monitor, and a pivot 220 connected with the base 210 and the bracket 230. The pivot 220 has a horizontal shaft 222, and a vertical shaft 221 being rotatable for connecting the bracket 230.

The cable arranging way is as following, first, folding the upper flexible cable 100a along the folding portions 111a and 114b so as to stack the upper flexible cable 100a with the lower flexible cable 100b. Let the flexible cable 100 threads through the pivot 220 along the vertical shaft 221. Rotating the second horizontal portion 130 and the second vertical portion 140 of the flexible cable 100 along the vertical shaft 221 until the curve 131 of the flexible cable 100 reaching the vertical shaft 221. Folding the second horizontal portion 130 so as to let the second horizontal portion 130 is positioned behind the horizontal shaft 222. Then bending the second vertical portion 140 of the flexible cable 100 along the horizontal shaft 222 so as to downwardly connect with a system unit.

For solving the rotating problem about rotating in horizontal and vertical directions, the traditional swivel structure occupied much space. Another aspect, the flexible cable has many folds for coordinating the swivel structure, so that increasing the manufacturing cost and difficulty. There are many complex procedures on the arranging of the flexible cable. Moreover, the flexible cable pass, coil and even fold between many elements, so that the flexible cable easily rubs with the elements of the swivel structure. After rotating many times, the flexible cable will be abraded easily so as to result in an interruption of electrical connecting and raising the possibility of breakdown.

As a practical matter, the prior art exists the following problems: the structure is too incompact to reduce the occupying space, the arranging and shape of the flexible cable is too complex to protect the cable from abrading and prolonging the use life.

Another aspect, for solving the problem of reversing picture when the monitor is being reversed, the prior art usually need an additional electrical detecting element. The detecting element is using the theory of electromagnetic induction or sheltering light for producing a reversing message. Then according the revering message to output pictures. It exists problems of increasing cost and number of elements at the same time.

SUMMARY OF THE INVENTION

An object of the present invention is to provide a swivel structure for information product with a compact structure, and a flexible cable with compact form and simplified arrangement.

It is another object of the invention to provide a swivel structure for information product having a function of detecting reversing condition and need not another detecting element.

In order to achieve the first object, a swivel structure for information product, used to connect a monitor and a main body of portable information product comprises a rotating mechanism, and a flexible cable. The rotating mechanism has a rotator, and a rotating pin. The rotator pivotally connects with the main body in a vertical axial direction. The rotating pin is rotatably mounted in the rotator and connects with the monitor in a horizontal axial direction. The flexible cable is generally formed in a general L-shape. The flexible cable is retractably winding in the rotator and electrically connects the monitor with the main body; whereby the monitor could rotate in horizontal or vertical direction, the cable is stretchable or retractable in the rotating mechanism for avoiding abrasion.

In order to achieve the second object, the rotating mechanism further has a detecting device. The detecting device has a detecting contactor which is engaged on the round base of the rotating pin, and a detecting printed circuit board which is fixed in the main body and is contiguous contact with the detecting contactor; whereby when the monitor rotates reversely, the detecting contactor outputs a reversal message to the main body for correspondingly to reverse an image.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
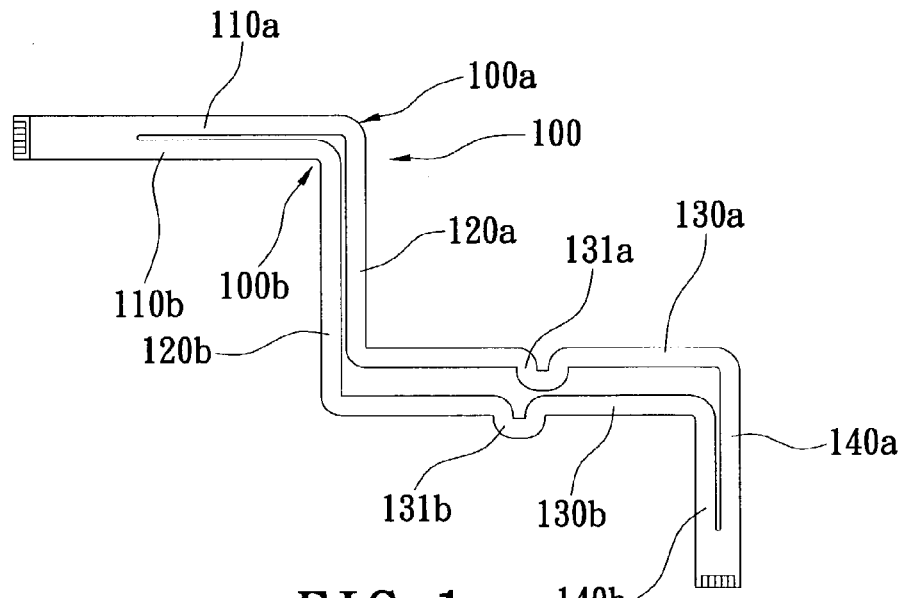
FIG. 1 is a perspective view of a cable in accordance with a prior art.
Figure 2:
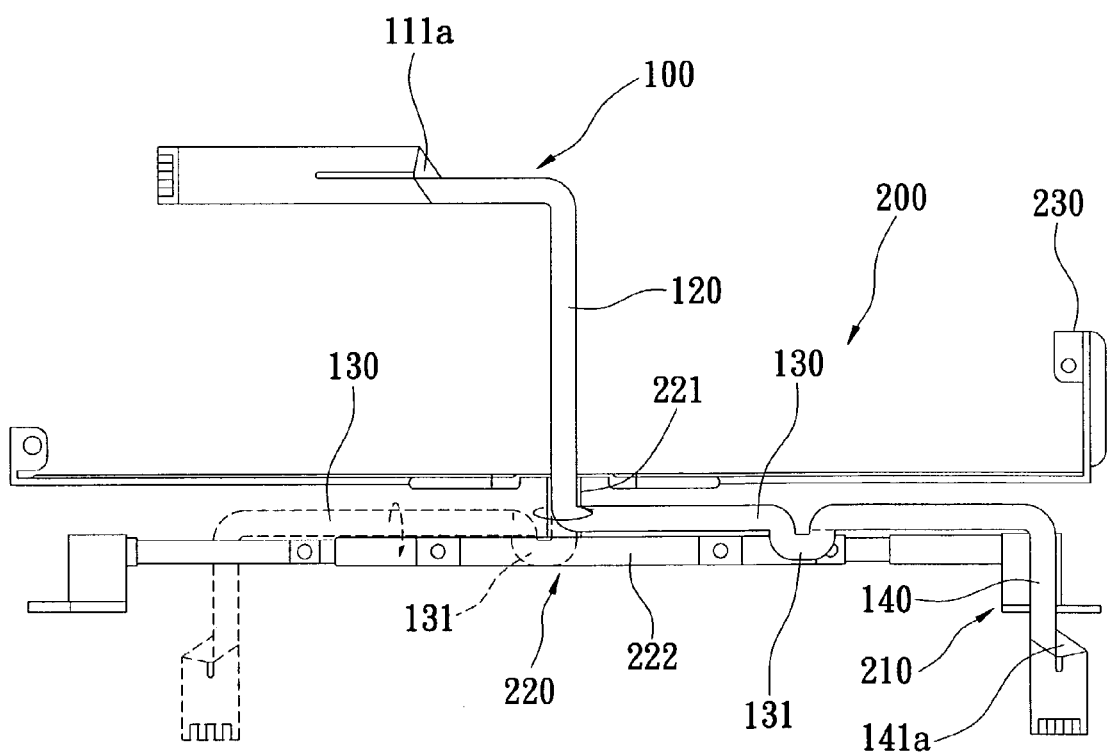
FIG. 2 is an assembling perspective view of the cable and a swivel structure of the prior art.
Figure 2A:
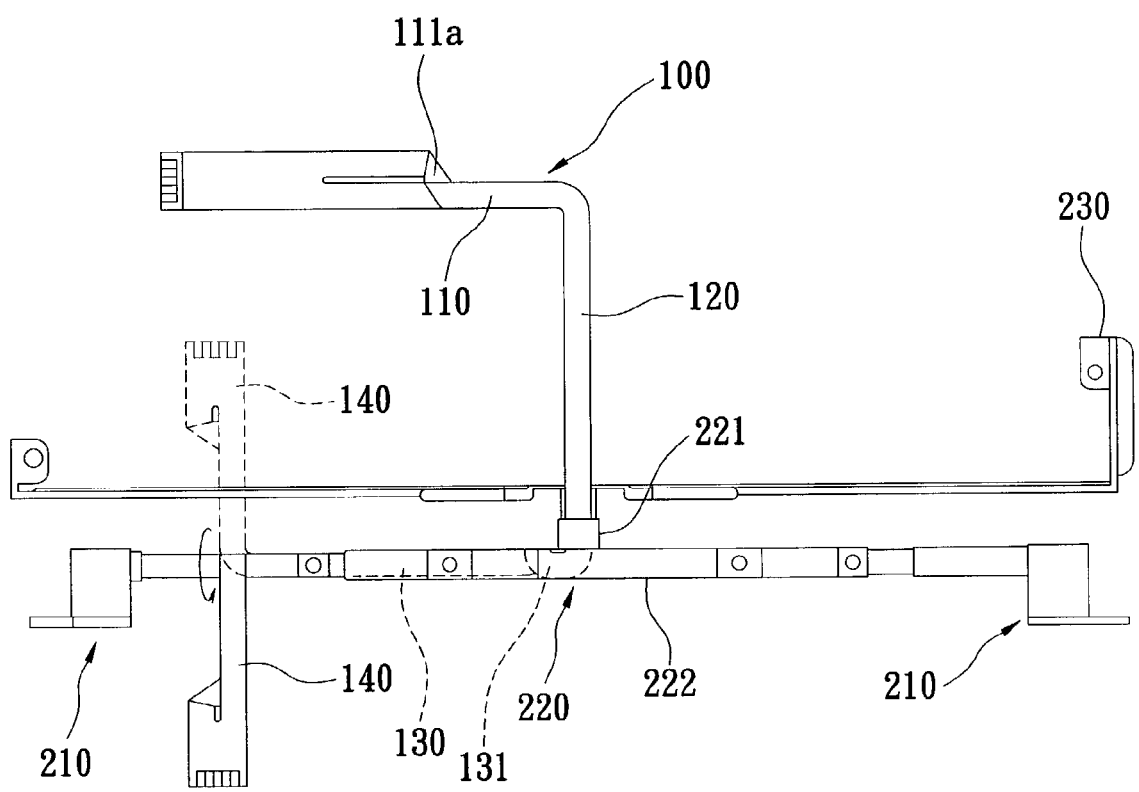
FIG. 2A is an assembling perspective view of the cable and the swivel structure of the prior art.
Figure 3:
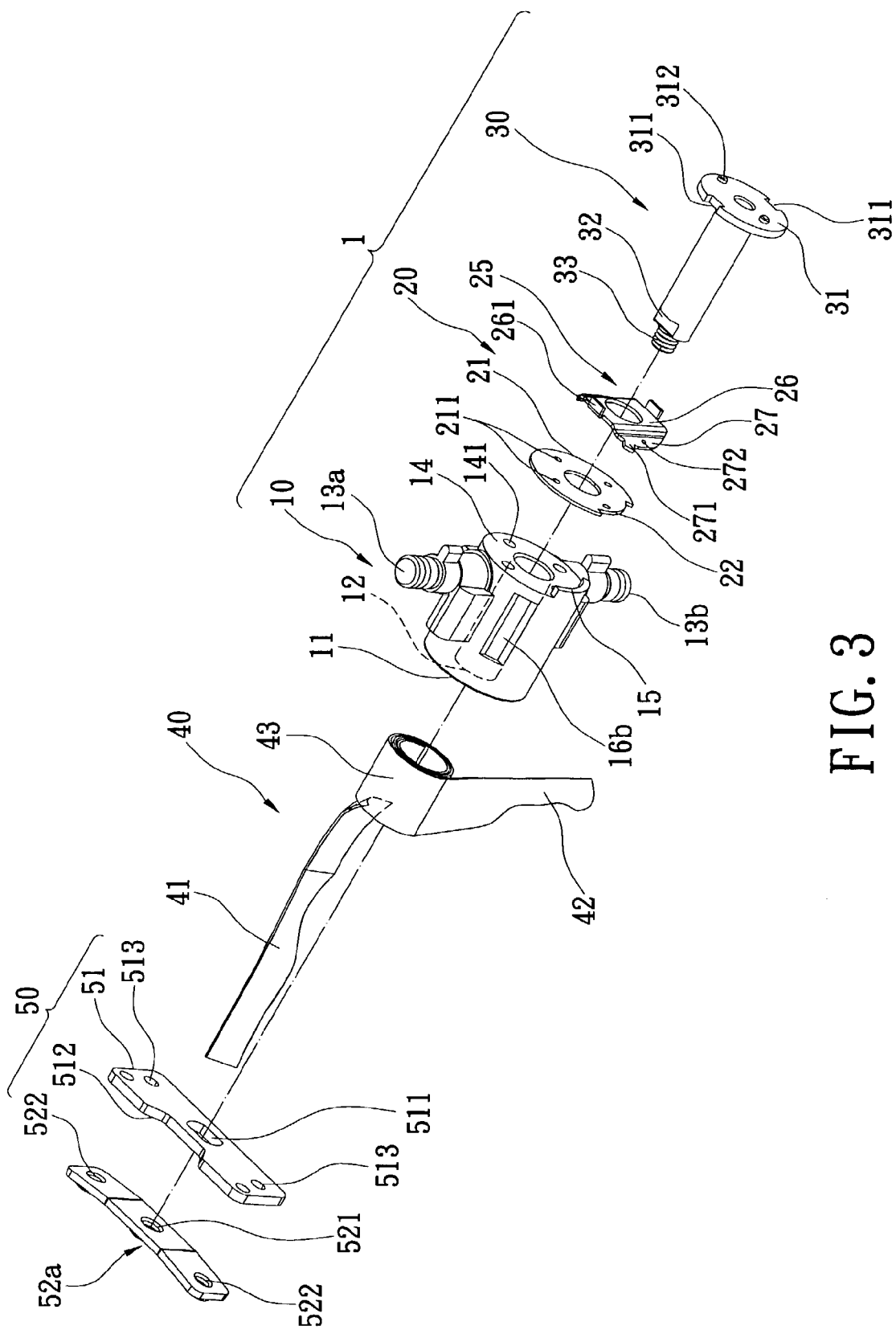
FIG. 3 is an exploded perspective view of a swivel structure of the present invention.
Figure 4:
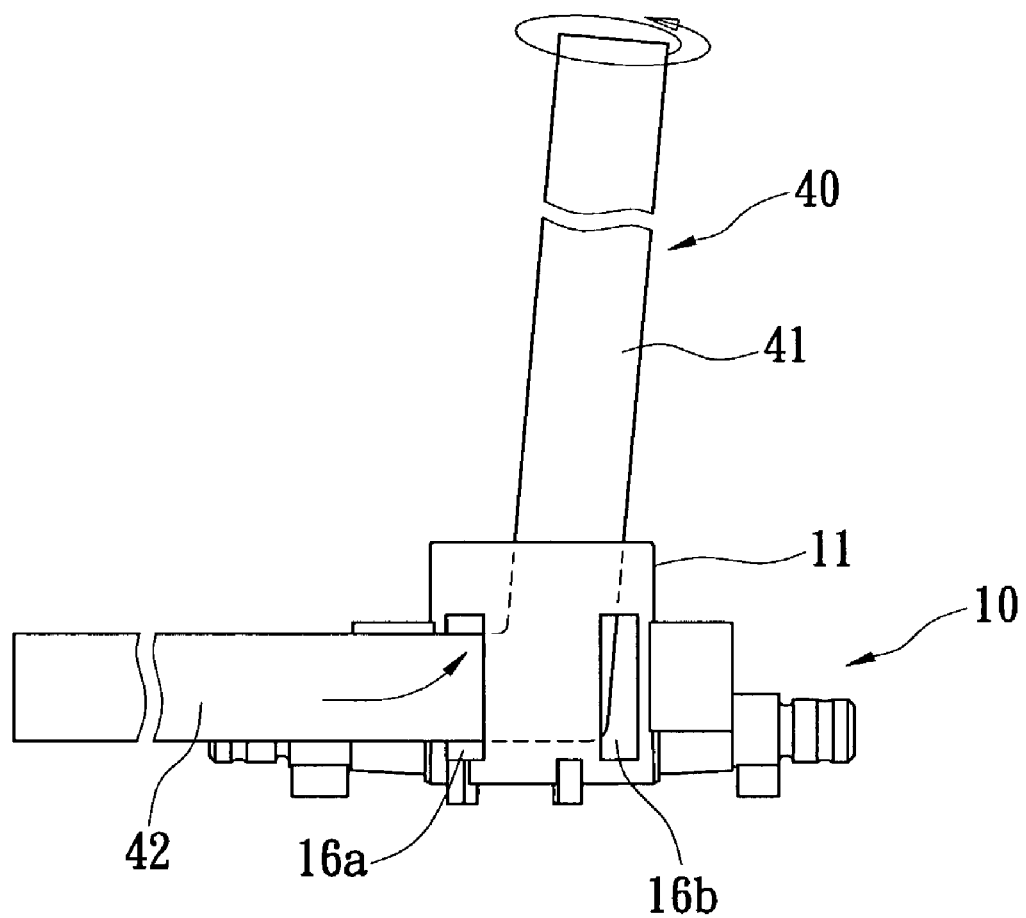
FIG. 4 is a perspective view of a cable and the present invention.

Referring to the FIGS. 3 and 4, the present invention of swivel structure for information product comprises a rotating mechanism 1, a flexible cable 40 and a retaining device 50. The cable 40 is used to connect a monitor 80 to a main body 70 of an information product.

The rotating mechanism 1 has a rotator 10, a position device 20 which is mounted on a bottom of the position device 20 and a rotating pin 30. The rotating pin 30 threads through the position device 20 and being pivotally mounted in the rotator 10. The position device 20 is used to limit a rotating angle of the rotating mechanism 1.

The rotator 10 has an outer ring 11, an inner ring 12, a pivot rod 13, and an annular bottom 14 that is connecting with the outer ring 11 and the inner ring 12. The rotator 10 is integrally cast in alloy, such as aluminum-alloy of zinc-alloy, for increasing the firmness and durability. The inner ring 12 is concentrically positioned in the outer ring 11 and defines a receiving space for receiving the cable 40. The pivot rod 13 vertically connects with a peripheral wall of the outer ring 11 for pivotally connecting with the main body 70 of information product (referring to FIGS. 8 and 9). In this embodiment, the pivot rod 13 has two ends 13a and 13b that are pivotally connecting to the main body 70 of information product via a ring or a pivoting seat. The outer ring 11 is formed with at least one axial slot 16 on a peripheral wall thereof. In this embodiment, the outer ring 11 has two axial slots 16a and 16b for providing two directions of cable arranging.

The position device 20 is used to limit the monitor 80 rotating in a predetermined angle. The position device 20 has a position block 15, a wafer 21 and a disk spring 25. The position block 15 is formed on the annular bottom 14 of the rotator 10. The wafer 21 has a recess 22 mating with the position block 15 for engaging on the annular bottom 14 of the rotator 10. The disk spring 25 has a radial base 26 and two wings 27 respectively connecting to two sides of the radial base 26. The radial base 26 has two tongues 261 vertically connecting to two sides thereof. One of the wings 27 has a tab 271 that is protruding therefrom. The tab 271 is contiguous to the wafer 21.

For the monitor 80 could be positioned on many various predetermined angles during rotating so as to enhancing the convenience of operating. The wafer 21 further has four position dimples 211 formed on the wafer 21 at predetermined angles, such as 0 degree for horizontally viewing, 90 degree for downwardly viewing, 180 degree for users photo themselves, and 270 degree for upwardly viewing. The round base 14 of the rotating pin 10 is formed with dimples 141 thereon. The dimples 141 of the round base 14 match up the position dimples 211 for enhancing position stability of the wafer 21. One of the wings 27 of the disk spring 25 is formed with an index tip 272 corresponding to the position dimples 211. When the monitor 80 is rotating, by the index tip 272 being positioned in the position dimples 211 so that the monitor 80 connected with the rotating pin 30 could stay on various predetermined angles.

The rotating pin 30 has a head end and a distal end. The head end is formed with a round base 31 thereon. The distal end is formed with an engaging portion 32 and a thread 33. The round base 31 is formed with two fixing grooves 311 corresponding with the two tongues 261 for engaging with the disk spring 25.

Figure 3A:
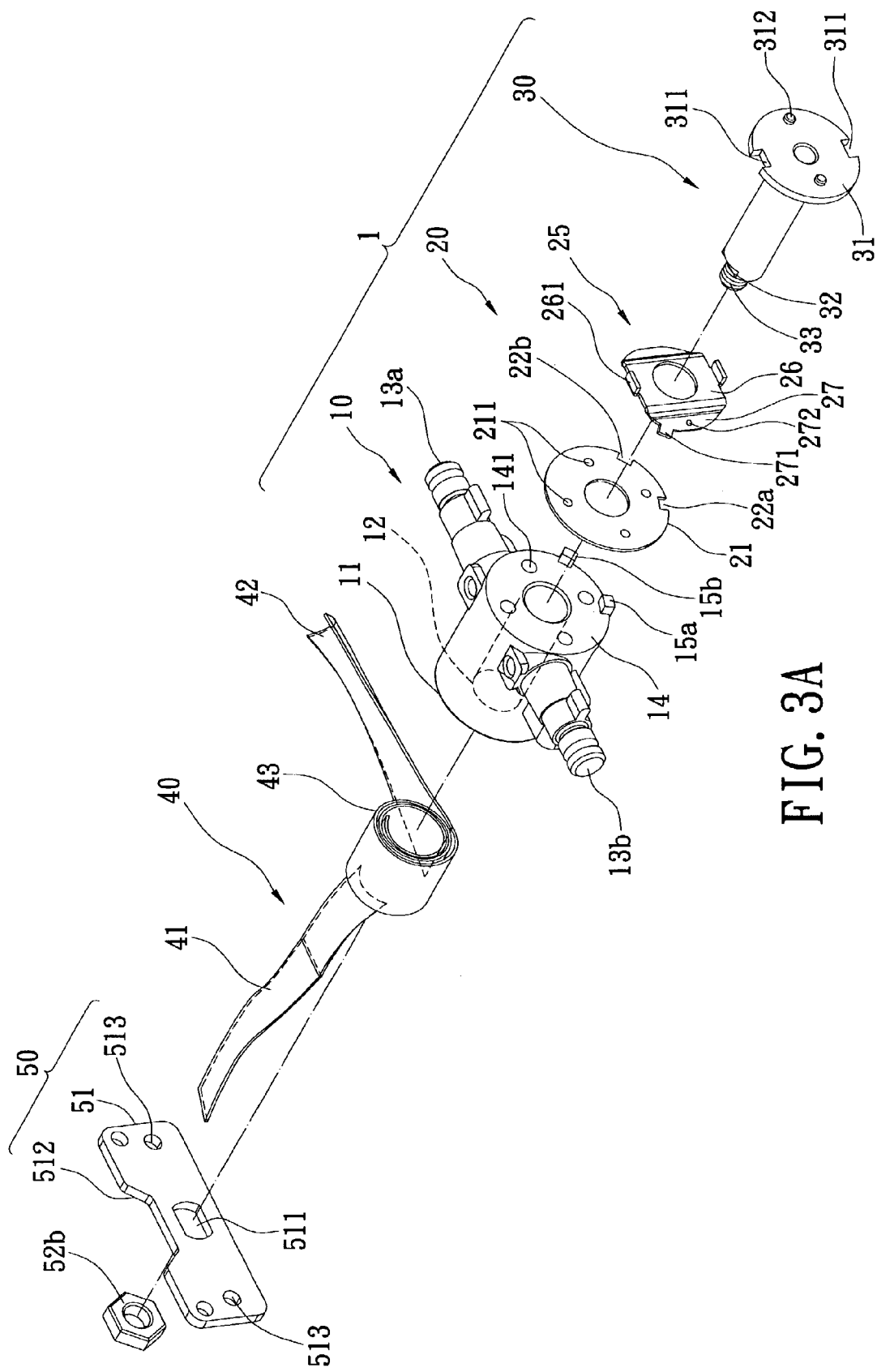
FIG. 3A is an exploded perspective view of a swivel structure in accordance with another embodiment of the present invention.

Referring to the FIG. 3A, the position device 20 has a pair of position blocks 15a and 15b that are formed on the annular bottom 14 of the rotator 10. The wafer 21 has a pair of recesses 22a and 22b mating with the position blocks 15a and 15b for engaging with the annular bottom 14.

The retaining device 50 is mounted on the distal end of the rotating pin 30 for connecting with the monitor 80. The retaining device 50 has a connecting bracket 51 and a connecting element 52 for clamping a bottom cover 81 of the monitor 80. The connecting bracket 51 has an engaging hole 511 formed on a middle thereof, a gap 512 formed thereon for let the cable 40 pass through, and a pair of through holes 513 formed on two sides of the engaging hole 511. The engaging hole 511 has a contour mating with a contour of the engaging portion 32 of the rotating pin 30 for engaging thereon. The contour of the engaging hole 511 is not limited. Only if the engaging hole 511 mates with the engaging portion 32 of the rotating pin 30, for examples a non-circle contour. The gap 512 is used to let the cable 40 threads through so as to extend into the monitor 80. The connecting element 52 is screwing with the thread 33 of the rotating pin 30, wherein the connecting element 52 could be a leaf spring 52a or a nut 52b. In the case of the leaf spring 52a, the leaf spring 52 has a screwing hole 521 and two stop holes 522 formed on two sides of the screwing hole 521. The screwing hole 521 is use to screwing with the thread 33 of the rotating pin 30. The stop holes 522 are screwing with the through holes 513 for avoiding the connecting element 52 to loosen.

Figure 5:
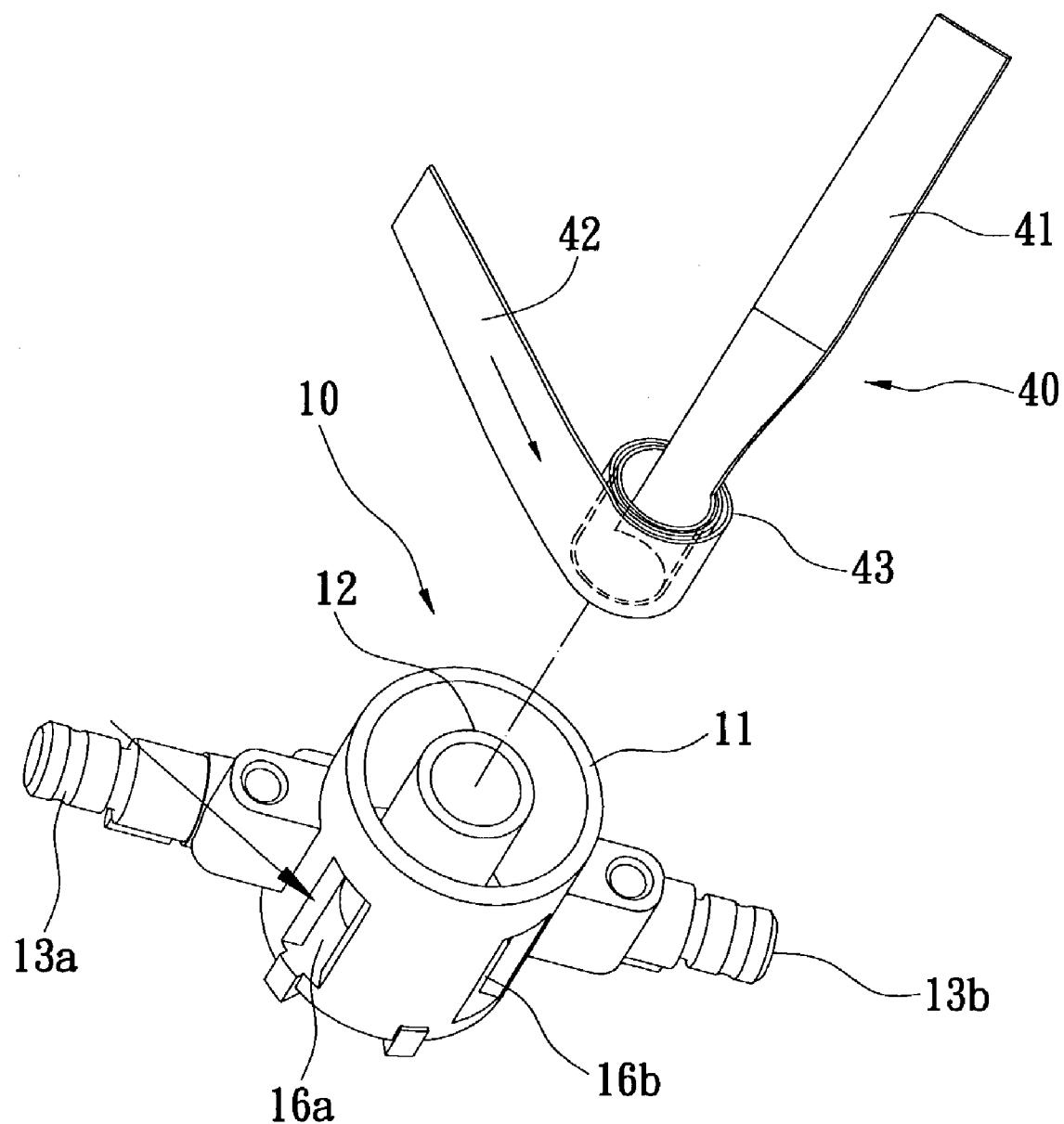
FIG. 5 is a perspective view of the cable and the present invention.

Referring to the FIGS. 4 and 5, the flexible cable 40 is generally formed in a L-shape. The cable 40 has a vertical portion 41 and a horizontal portion 42 vertically connected with the vertical portion 41. The vertical portion 41 is disposed in the receiving space between the outer ring 11 and the inner ring 12. The vertical portion 42 is extending outwardly along an axle direction of the rotator 10. The horizontal portion 42 is retractably winding around the inner ring 12 so as to form a winding portion 43 and extending from the slot 16 of the outer ring 11 for electrically connecting with the main body 70. The cable 40 is like a torsion spring. When the monitor 80 is turning and pulling the vertical portion 41 of the cable 40, the winding portion 43 could be twisted tightly or loosely as a torsion spring. For avoiding the cable 40 to displace, the horizontal portion 42 could be adhered to the outer ring 11 of the rotator 10.

Figure 6:
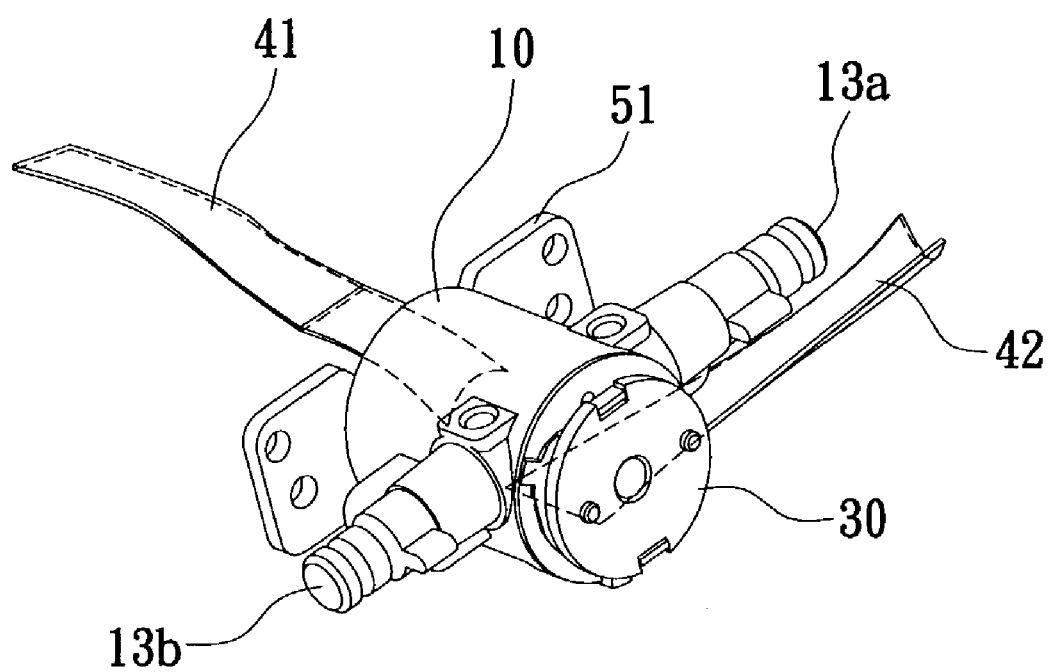
FIG. 6 is a perspective assembling view of the swivel structure of the present invention.
Figure 7:
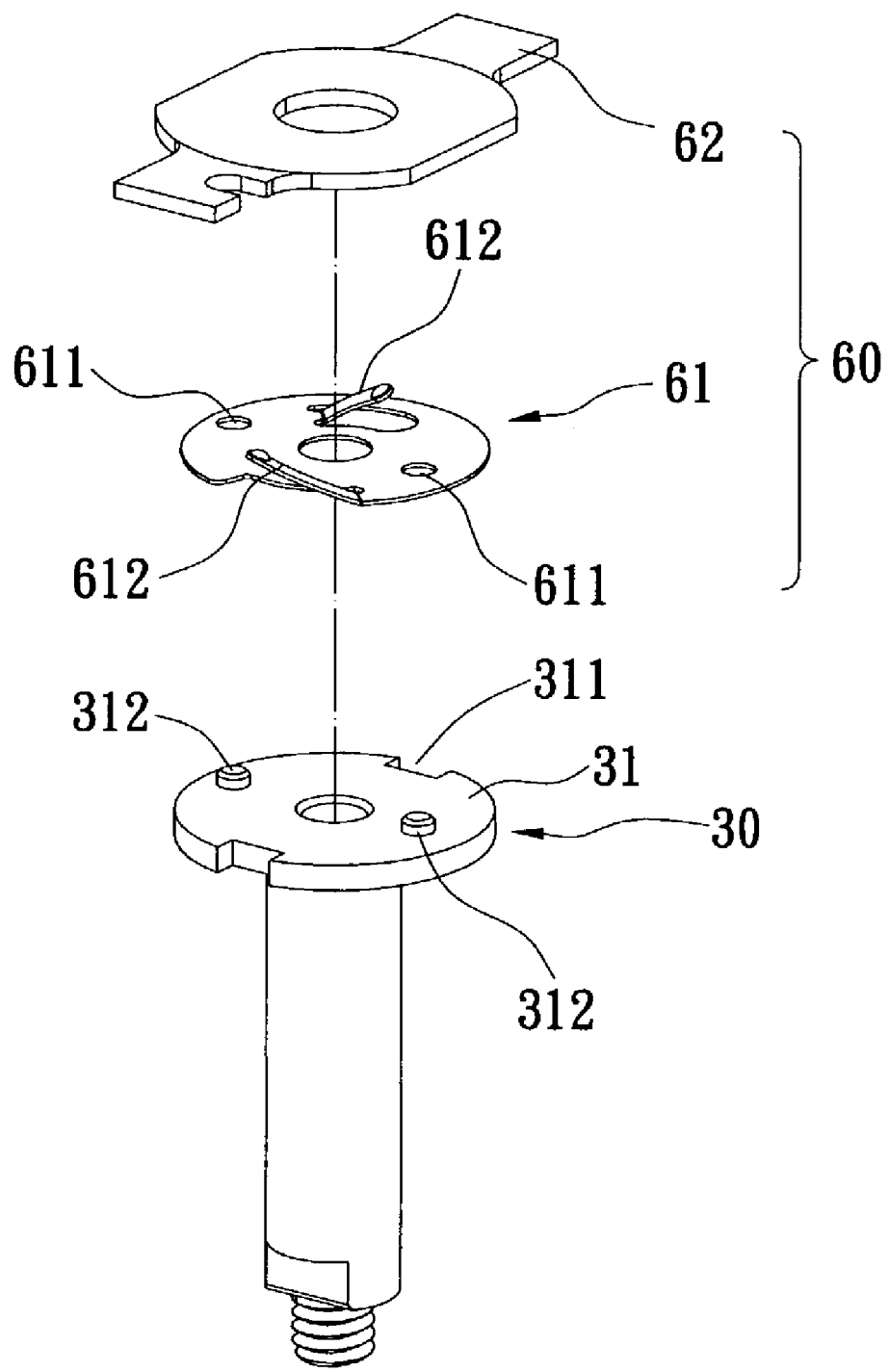
FIG. 7 is a perspective exploded view of a detecting device of the present invention.

Referring to the FIGS. 6 and 7, the FIG. 6 is a perspective view of the present invention, and the FIG. 7 is a perspective exploded view of a detecting device of the present invention. When the monitor 80 is turning reversely with an angle of 180 degrees, images should be reversed for the users conveniently using, such as self-photo. The rotating mechanism 1 further has a detecting device 60 mounted on the round base 31 of the rotating pin 30 for detecting a 180 degrees position of the monitor 80. The detecting device 60 has a detecting contactor 61 engaged on the round base 31 of the rotating pin 30, and a detecting printed circuit board 32 fixed in the main body 80 and being contiguous contact with the detecting contactor 61. Wherein, the detecting contactor 61 is a circle board which is formed with two assembling holes 611 and two brushes 61 thereon 2. The round base 31 is formed with two posts 312 thereon corresponding to the assembling holes 611. The assembling holes 611 are engaged on the two posts 312 of the round base 31. The assembling holes 611 respectively has a different distance from a center of the round base 31 so as to avoiding from mounting wrongly, the brushes 612 respectively protruding from the connecting contactor 61 and electrically connecting to each. When the monitor 80 rotates reversely, the brushes 612 conduct a circuit of the connecting printed circuit board 62 and communicating a reversal message to the main body 70 so that let the main body 70 processing a video message for correspondingly to reverse an image.

Figure 8:
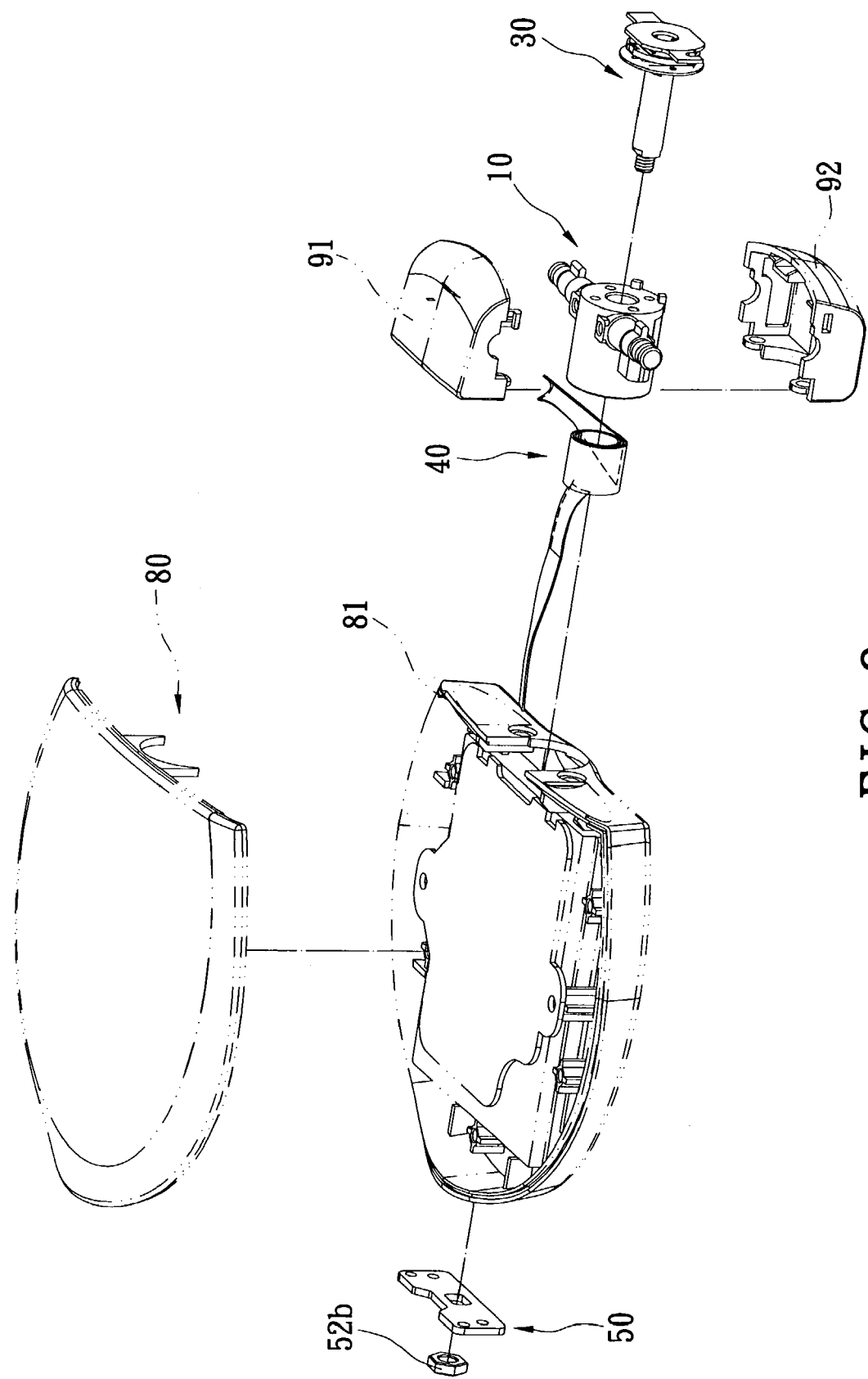
FIG. 8 is a perspective view of the present invention connecting with a monitor of digital camera.

Referring to the FIG. 8, the rotating mechanism 1 further be covered with an upper lid 91 and a lower lid 92 for increasing pleasing to the eye, and the connecting printed circuit board 62 is fixed therein.

Figure 9:
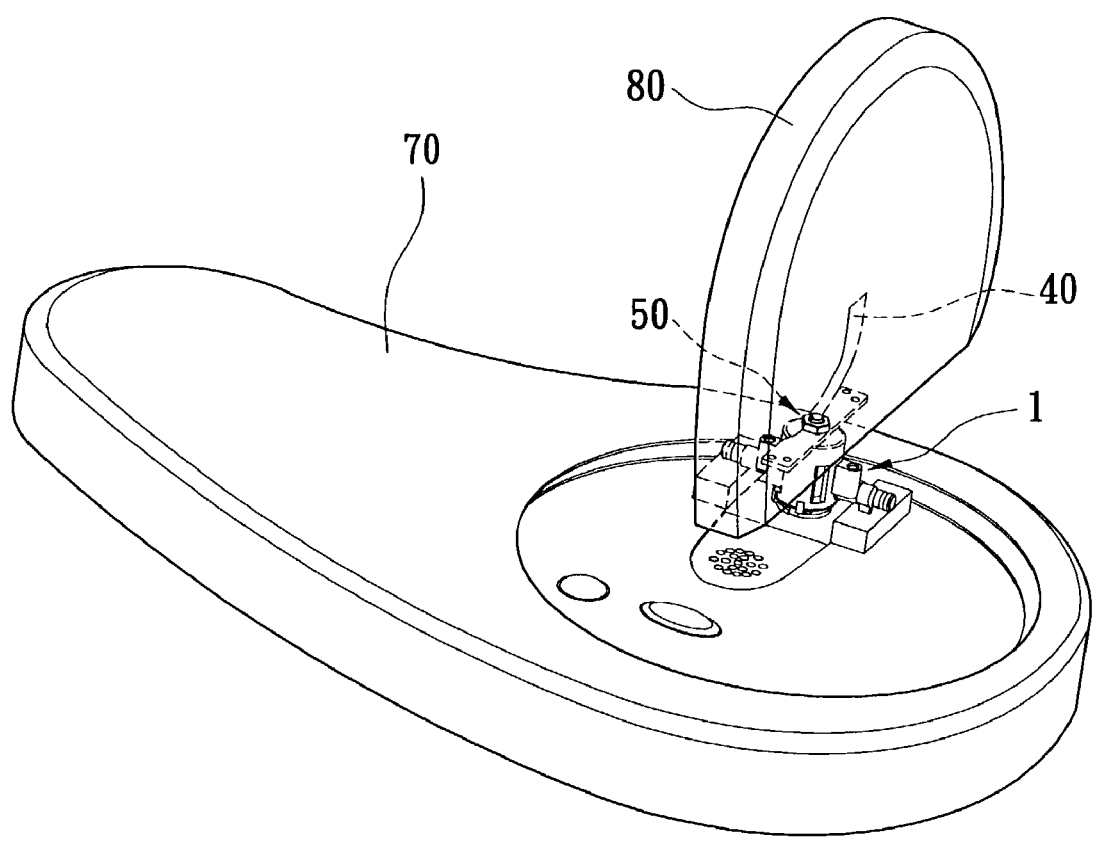
FIG. 9 is a perspective view of the present invention in a digital camera.

FIG. 9 is a perspective view of the present invention being mounted in a digital camera.

The sum up of the characters and advantages are as follow: the present invention has a compact structure, and a flexible cable with compact form and simplified arrangement. Moreover, the invention provides a swivel structure with a function of detecting reversing condition and need not another detecting device.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A swivel structure for information product, used to connect a monitor and a main body of portable information product, comprising:
   a rotating mechanism having a rotator and a rotating pin, said rotator pivotally connecting with said main body in a vertical axial direction, said rotating pin rotatably mounted in said rotator and connecting with said monitor in a horizontal axial direction;
   a flexible cable generally formed in a general L-shape, said flexible cable retractably winding in said rotator, and electrically connecting said monitor with said main body; and whereby
   said monitor could rotate in horizontal or vertical direction, said cable is stretchable or retractable in said rotating mechanism for avoiding abrasion.

2. A swivel structure for information product according to claim 1, wherein said rotator has
   an outer ring formed with at least one axial slot on a peripheral wall thereof;
   an inner ring concentrically positioned in said outer ring and defining a receiving space between;
   a pivot rod vertically connected with a peripheral wall of said outer ring, and pivotally connected with said main body;
   an annular bottom connecting with said outer ring and said inner ring; and wherein
   said rotating pin is rotatably mounted in said inner ring of said rotator within an angular range, said rotating pin has a head end and a distal end, said head end formed with a round base thereof, said distal end being fixed with said monitor.

3. A swivel structure for information product according to claim 2, wherein said flexible cable has
   a vertical portion being disposed in said receiving space between said outer ring and said inner ring, and extending outwardly in an axial direction of said rotator; and
   a horizontal portion vertically connected with said vertical portion, said horizontal portion spirally mounted in said receiving space of said rotator and projecting from one of said slots of said outer ring.

4. A swivel structure for information product according to claim 2, wherein the rotating mechanism further has a position device, comprising:
   a pair of position blocks formed on said annular bottom of said rotator;
   a wafer having a pair of recesses corresponding to said position blocks for engaging on said annular bottom of said rotator;
   a disk spring having a pair of tongues vertically connecting with an edge thereof, and a tab protruding from said edge thereof; and wherein
   said round base of said rotating pin formed with a pair of fixing grooves thereon for respectively receiving said tongues, and said tab is contiguous to said wafer.

5. A swivel structure for information product according to claim 2, wherein the rotating mechanism further has a position device, comprising:
   a position block formed on said annular bottom of said rotator;
   a wafer having a recess corresponding to said position block for engaging on said annular bottom of said rotator;
   a disk spring having a pair of tongues vertically connecting with an edge thereof and a tab protruding from the edge thereof; and wherein
   said round base of said rotating pin is formed with a pair of fixing grooves thereon for respectively receiving said tongues, and said tab is contiguous to said wafer.

6. A swivel structure for information product according to claim 5, wherein said position device further has a plurality of position dimples with predetermined angles formed on said wafer, an index tip corresponding to said position dimples formed on said disk spring; whereby said monitor could be positioned on said predetermined angles during rotating without sliding.

7. A swivel structure for information product according to claim 2, wherein the rotating mechanism further has a retaining device mounted on a distal end of said rotating pin for connecting to the monitor;
   said retaining device having a connecting bracket and a connecting element, said connecting bracket formed with a engaging hole thereon, said distal end of said rotating pin formed with a engaging portion thereon corresponding to said engaging hole for engaging with said connecting bracket, said connecting element fixed said connecting bracket on the distal end of said rotating pin.

8. A swivel structure for information product according to claim 7, wherein the connecting element is a nut.

9. A swivel structure for information product according to claim 7, wherein the connecting element is a leaf spring, said leaf spring having a screwing hole formed on a middle thereof and a pair of stop holes formed on two sides of said screwing hole, said screwing hole screwing to said distal end of said rotating pin, said stop holes correspondingly screwing to two screwing holes of said connecting bracket.

10. A swivel structure for information product according to claim 2, wherein the rotating mechanism further has a detecting device comprising
   a detecting contactor engaged on said round base of said rotating pin; and
   a detecting printed circuit board being fixed in said main body and being contiguous contact with said detecting contactor; whereby when said monitor rotates reversely, said detecting contactor electrically conducts said detecting printed circuit board, and said detecting printed circuit board outputs a reversal message to said main body for correspondingly reversing an image.

11. A swivel structure for information product according to claim 10, wherein said detecting contactor is a circle board having two assembling holes, and two brushes, said assembling holes engaged on said round base, said assembling holes respectively has a different distance from a center of said round base for avoiding from mounting wrongly, said brushes respectively protruding from said connecting contactor and electrically connecting to each; whereby when said monitor rotates reversely, said brushes electrically conduct a circuit of said connecting printed circuit board and outputting a reversal message to said main body for correspondingly reversing an image.

* * * * *